United States Patent [19]
Liu et al.

[11] Patent Number: 5,864,637
[45] Date of Patent: Jan. 26, 1999

[54] METHOD AND APPARATUS FOR IMPROVED VIDEO DECOMPRESSION BY SELECTIVE REDUCTION OF SPATIAL RESOLUTION

[75] Inventors: Yi Liu; Michael R. Tucker; Geoffrey S. Strongin, all of Austin, Tex.

[73] Assignee: Advanced Micro Devices, Inc., Sunnyvale, Calif.

[21] Appl. No.: 423,912

[22] Filed: Apr. 18, 1995

[51] Int. Cl.[6] .................................................. G06K 9/36
[52] U.S. Cl. ........................................ 382/233; 382/250
[58] Field of Search .................................... 382/235, 239, 382/233, 250; 358/432, 433; 348/405, 395

[56] References Cited

U.S. PATENT DOCUMENTS

| | | | |
|---|---|---|---|
| 4,797,944 | 1/1989 | Tanaka | 382/239 |
| 5,144,424 | 9/1992 | Savatier | 358/133 |
| 5,150,210 | 9/1992 | Hoshi et al. | 358/135 |
| 5,164,828 | 11/1992 | Tahara et al. | 358/136 |
| 5,227,878 | 7/1993 | Puri et al. | 358/136 |
| 5,241,395 | 8/1993 | Chen | 382/250 |
| 5,247,363 | 9/1993 | Sun et al. | 358/167 |
| 5,315,670 | 5/1994 | Shapiro | 382/56 |
| 5,333,212 | 7/1994 | Ligtenberg | 382/250 |
| 5,347,308 | 9/1994 | Wai | 348/394 |
| 5,357,282 | 10/1994 | Lee | 348/403 |
| 5,371,547 | 12/1994 | Siracusa et al. | 348/426 |
| 5,371,611 | 12/1994 | Kato et al. | 358/456 |
| 5,386,232 | 1/1995 | Golin et al. | 348/391 |
| 5,410,553 | 4/1995 | Choon | 371/31 |
| 5,450,599 | 9/1995 | Horvath et al. | 395/800 |
| 5,452,104 | 9/1995 | Lee | 358/433 |
| 5,467,131 | 11/1995 | Bhaskaran et al. | 348/384 |

(List continued on next page.)

FOREIGN PATENT DOCUMENTS

| | | |
|---|---|---|
| 0 283 735 A2 | 2/1988 | European Pat. Off. . |
| 0 493 086 A2 | 12/1991 | European Pat. Off. . |
| 2 267 410 | 5/1993 | United Kingdom . |

OTHER PUBLICATIONS

Dr. Richard Baker, "Standards Dominate Videoconferencing Implementations", Computer Design, Dec. 1994, pp. 66–70.

Stephen Ohr, "Digital Video Spearheads TV and Videoconferencing Applications", Computer Design, Dec. 1994, pp. 59–64.

Lawrence A. Rowe, et al., "MPEG Video in Software: Representation, Transmission, and Playback", High Speed Networking and Multimedia Computing, Symp. on Elec. Imaging Sci. & Tech., San Jose, CA, Feb., 1994, 1994, pp. 1–11.

Peng H. Ang, et al., "Video Compression Makes Big Gains", IEEE Spectrum, Oct. 1991, pp. 16–19.

Andy C. Hung, et al, "A Comparison of Fast Inverse Discrete Cosine Transform Algorithms", Multimedia Systems, ©1994, pp. 204–217.

(List continued on next page.)

*Primary Examiner*—Yon Couso
*Attorney, Agent, or Firm*—Skjerven, Morrill, MacPherson, Franklin & Friel LLP; Ken J. Koestner

[57] ABSTRACT

A video system examines the transform domain content of various spatially related blocks in a compressed video bitstream to determine whether predetermined types of similarities exist between multiple blocks. When certain selected similarities are found, the video system spatially combines the blocks in a predetermined manner. In some embodiments, DCT coefficients of a plurality of blocks are averaged to form one averaged block and the averaged block is inverse discrete cosine transformed. The averaged and IDCT transformed block is written to the display at the position of each of the averaged blocks. In some embodiments, a representative block of a plurality of DCT coefficient blocks is selected and inverse discrete cosine transformed. The selected and IDCT transformed block is written to the display at the position of each of the plurality of blocks.

10 Claims, 4 Drawing Sheets

U.S. PATENT DOCUMENTS

| | | | |
|---|---|---|---|
| 5,481,364 | 1/1996 | Ito | 358/261.1 |
| 5,489,944 | 2/1996 | Jo | 348/405 |
| 5,490,130 | 2/1996 | Akagiri | 369/124 |
| 5,502,493 | 3/1996 | Meyer | 348/426 |
| 5,510,840 | 4/1996 | Yonemitsu et al. | 348/402 |
| 5,523,847 | 6/1996 | Feig et al. | 358/261.3 |
| 5,543,846 | 8/1996 | Yagasaki | 348/415 |
| 5,552,832 | 9/1996 | Astle | 348/420 |
| 5,559,557 | 9/1996 | Kato | 348/405 |
| 5,625,714 | 4/1997 | Fukuda | 382/239 |

OTHER PUBLICATIONS

P1180/D1, "Draft Standard Specification for the Implementations of 8×8 Inverse Discrete Cosine Transform", May 29, 1990, pp. 1–9.

ISO/IEC 11172–1, Information Technology–Coding of Moving Pictures and Associated Audio for Digital Storage Media at up to about 1,5 Mbit/s—Part 1: Systems, Aug. 1, 1993, pp. i–vi, 1–53.

ISO/IEC 11172–2, Information Technology–Coding of Moving Pictures and Associated Audio for Digital Storage Media at up to about 1,5 Mbit/s—Part 1: Video, Aug. 1, 1993, pp. i–ix, 1–112.

ISO/IEC 11172–3, Information Technology–Coding of Moving Pictures and Associated Audio for Digital Storage Media at up to about 1,5 Mbit/s—Part 1: Audio, Aug. 1, 1993, pp. i–vi, 1–150.

Kevin L. Gong, et al., "Parallel MPEG–1 Video Encoding", Report, University of California, Berkeley, Computer Science Division, 1994, pp. 1–14.

METHOD AND APPARATUS FOR IMPROVED VIDEO DECOMPRESSION BY SELECTIVE REDUCTION OF SPATIAL RESOLUTION

RELATED PATENT APPLICATIONS

The present invention is related to subject matter which is disclosed in:

U.S. patent application Ser. No. 08/423,913 filed on the same day as the present patent application now pending (Geoffrey S. Strongin, Yi Liu and Michael R. Tucker, "Method and Apparatus for Improved Video Decompression by Selection of IDCT Method Based on Image Characteristics", U.S. patent application Ser. No. 08/423,918 filed on the same day as the present patent application now abandoned (Michael R. Tucker, Geoffrey S. Strongin and Yi Liu, "Method and Apparatus for Improved Video Decompression by Prescaling of Pixel and Error Terms Prior to Merging", U.S. patent application Ser. No. 08/424,738 filed on the same day as the present patent application now abandoned (Yi Liu, Michael R. Tucker and Geoffrey S. Strongin, "Method and Apparatus for Hybrid VLC Bitstream Decoding", and U.S. patent application Ser. No. 08/424,736 filed on the same day as the present patent application now pending (Geoffrey S. Strongin, Yi Liu and Michael R. Tucker, "Method and Apparatus for Prestoring Dequantization Information for DCT VLC Decoding".

Each of the identified patent applications is incorporated herein by reference in its entirety.

The present invention is related to subject matter which is disclosed in:

U.S. patent application Ser. No. 08/443,206 filed on the same day as the present patent application now U.S. Pat. No. 5,680,482 (Yi Liu, Michael R. Tucker, and Geoffrey S. Strongin, "Method and Apparatus for Improved Video Decompression by Adaptive Selection of Video Input Parameters", and U.S. patent application Ser. No. 08/423,914 filed on the same day as the present patent application now pending (Geoffrey S. Strongin, Yi Liu and Michael R. Tucker, "Method and Apparatus for Improved Video Decompression by Predetermination of IDCT Results Based on Image Characteristics").

FIELD OF INVENTION

The present invention relates to decompression of video information and, more particularly, to improved performance of video decompression by selectively reducing spatial resolution.

BACKGROUND OF THE INVENTION

Video information requires a large amount of storage space, therefore video information is generally compressed before it is stored. Accordingly, to display compressed video information which is stored, for example, on a compact disk read only memory (CD ROM), the compressed video information is decompressed to furnish decompressed video information. The decompressed video information is then communicated in a bit stream to a display. The bit stream of video information is generally stored in a plurality of memory storage locations corresponding to pixel locations on a display. The stored video information is generally referred to as a bit map. The video information representing a single screen of information on a display is called a picture. A goal of many video systems is to quickly and efficiently decode compressed video information to enable a motion video capability.

Standardization of recording media, devices and various aspects of data handling, such as video compression, is highly desirable for continued growth of this technology and its applications. One compression standard which has attained wide spread use for compressing and decompressing video information is the moving pictures expert group (MPEG) standard for video encoding and decoding. The MPEG standard is defined in International Standard ISO/IEC 11172-1, "Information Technology—Coding of moving pictures and associated audio for digital storage media at up to about 1.5 Mbit/s", Parts 1, 2 and 3, First edition 1993-08-01 which is hereby incorporated by reference in its entirety.

Pictures within the MPEG standard are divided into 16×16 pixel macroblocks. Each macroblock includes six 8×8 blocks: four luminance (Y) blocks, one chrominance red (Cr) block and one chrominance blue (Cb) block. The luminance blocks correspond to sets of 8×8 pixels on a display and control the brightness of respective pixels. The chrominance blocks to a large extent control the colors for sets of four pixels. For each set of four pixels on the display, there is a single Cr characteristic and a single Cb characteristic.

For example, referring to FIG. 1, labeled prior art, a picture presented by a typical display includes 240 lines of video information in which each line has 352 pixels. Accordingly, a picture includes 240×352=84,480 pixel locations. Under the MPEG standard, this picture of video includes 44 by 30 luminance blocks or 1320 blocks of luminance video information. Additionally, because each macroblock of information also includes two corresponding chrominance blocks, each picture of video information also includes 330 Cr blocks and 330 Cb blocks. Accordingly, each picture of video information requires 126,720 pixels or a total of 1,013,760 bits of bit mapped storage space for presentation on a display.

Video systems that comply with various imaging coding standards, such as the MPEG standard, utilize video compression in which blocks of pixels in a picture of a series of pictures are encoded using prediction. In prediction encoding, pixels in a predicted picture are predicted from a previous picture using a motion compensation operation in which pixels have generally the same values as pixels of the previous picture except that pixels are shifted. A motion compensated picture is compactly encoded by storing the motion vector from the previous picture to the predicted picture. To more accurately encode the predicted picture, error terms are added to the motion compensated picture to account for differences between the motion compensated picture and the actual previous picture. At the encoder, the error terms are transformed using the discrete cosine transform (DCT) and quantized to reduce the number of bits encoded. At the decoder, the error terms are computed by inverse quantization and inverse discrete cosine transformation (IDCT). The result of the IDCT operation are restored error terms. A motion compensated picture is reconstructed in accordance with the encoded motion vector. Restored error terms are added to pixels of the reconstructed motion compensated picture. Due to quantization, the restored picture is typically not exactly the same as the original pixels prior to compression.

There are three types of pictures of video information which are defined by the MPEG standard, intra-pictures (I picture), forward predicted pictures (P picture) and bi-predicted pictures (B picture).

An I picture is encoded as a single image having no reference to any past or future picture. Each block of an I picture is encoded independently. Accordingly, when decoding an I picture, no motion processing is necessary. However, for the reasons discussed below, it is necessary to store and access I pictures for use in decoding other types of pictures.

A P picture is encoded relative to a past reference picture. A reference picture is a P or I picture. The past reference picture is the closest preceding reference picture. Each macroblock in a P picture can be encoded either as an I macroblock or as a P macroblock. A P macroblock is stored as a translated 16×16 area of a past reference picture plus an error term. To specify the location of the P macroblock, a motion vector (i.e., an indication of the relative position of the macroblock in the current picture to the position of the translated area in the past reference picture) is also encoded. When decoding a P macroblock, the 16×16 area from the reference picture is offset according to a motion vector. The decoding function accordingly includes motion compensation, which is performed on a macroblock, in combination with error (IDCT) terms, which are defined on a block by block basis.

A B picture is encoded relative to the past reference picture and a future reference picture. The future reference picture is the closest proceeding reference picture. Accordingly, the decoding of a B picture is similar to that of an P picture with the exception that a B picture motion vector may refer to areas in the future of the reference picture. For macroblocks that use both past and future reference pictures, the two 16×16 areas are averaged. The macroblocks from the reference pictures are offset according to motion vectors.

Pictures are coded using a discrete cosine transform (DCT) coding scheme which transforms pixels (or error terms) into a set of coefficients corresponding to amplitudes of specific cosine basis functions. The discrete cosine transform is applied in image compression to decorrelate picture data prior to quantization. The DCT coefficients are further coded using variable length coding. Variable length coding (VLC) is a statistical coding technique that assigns codewords to values to be encoded. Values of high frequency of occurrence are assigned short codewords, and those of infrequent occurrence are assigned long codewords. On the average, the more frequent shorter codewords dominate so that the code string is shorter than the original data.

For a video system to provide a motion video capability, compressed video information must be quickly and efficiently decoded. One aspect of the decoding process is inverse discrete cosine transformation (IDCT). A second aspect is a motion compensation operation. Both the IDCT operation and the motion compensation operation are computationally intensive operations. Over a wide range of processor capabilities and image characteristics, a condition sometimes arises in which the picture decoding operation overburdens a video system. Under this condition, video frames are commonly dropped or a lag in motion video results.

A technique for improving the efficiency of operation of the IDCT and motion compensation operations is needed to prevent overburdening of the video system.

SUMMARY OF THE INVENTION

One of the most time consuming steps in a video decompression process is the inverse discrete cosine transform on NxN frequency coefficient blocks, where N is typically equal to eight. Processing speed is greatly improved at the expense of a slight reduction in video quality by reducing the size of the frequency coefficient blocks by reducing the frequency resolution.

In many pictures of a motion video sequence, large areas of pixels have a slowly varying spatial content. The video system of the present invention exploits this condition by "spatially combining" multiple DCT coefficient blocks.

A DCT coefficient block is a block of 8×8 pixels which is transformed into a transform domain representation approximating a frequency-domain form via performance of a DCT operation. DCT transformation does not change the nature of the mutual relationship of the 8×8 blocks of a picture. Each block still describes a spatial portion of the picture, even though the information describing the spatial portion of the picture is represented in a transform domain form. The video system examines the transform domain content of various spatially related blocks in a compressed video bitstream to determine whether predetermined types of similarities exist between multiple blocks. When certain selected similarities are found, the video system spatially combines the blocks in a predetermined manner. In some embodiments, DCT coefficients of a plurality of blocks are averaged to form one averaged block and the averaged block is inverse discrete cosine transformed. The averaged and IDCT transformed block is written to the display at the position of each of the averaged blocks. In some embodiments, a representative block of a plurality of DCT coefficient blocks is selected and inverse discrete cosine transformed. The selected and IDCT transformed block is written to the display at the position of each of the plurality of blocks. In some embodiments, a smaller number of coefficients is included in a block for inverse discrete cosine transformation. For example, the lower frequency coefficients of an 8×8 block are used to form a 4×4 block and the 4×4 block is transformed.

The video decoding apparatus taught herein is advantageous for greatly reducing the computational burden of video decoding by spatially combining multiple DCT coefficient blocks, thereby reducing the effective size of the DCT blocks. In contrast, a conventional video player processes pixels in fixed block sizes, for example 16×16 pixel macroblocks and 8×8 pixel blocks.

DETAILED DESCRIPTION

Figure 1:
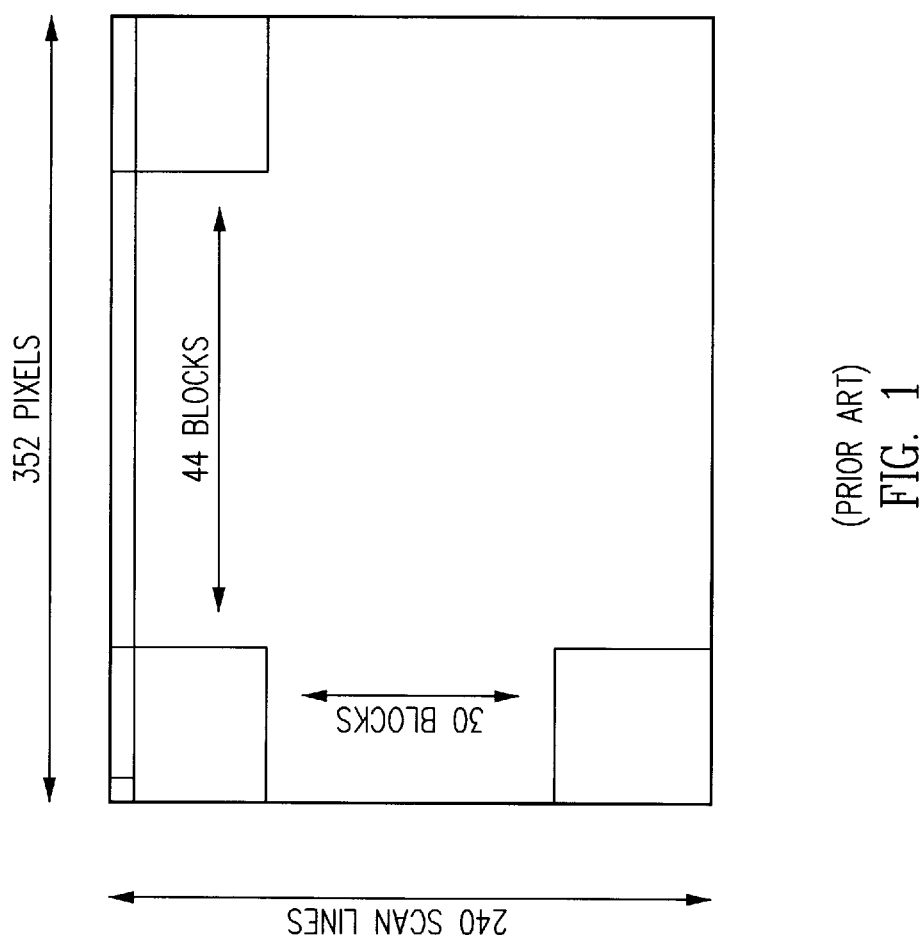
FIG. 1, labeled prior art, shows an arrangement of blocks of pixels on a display screen.
Figure 2:
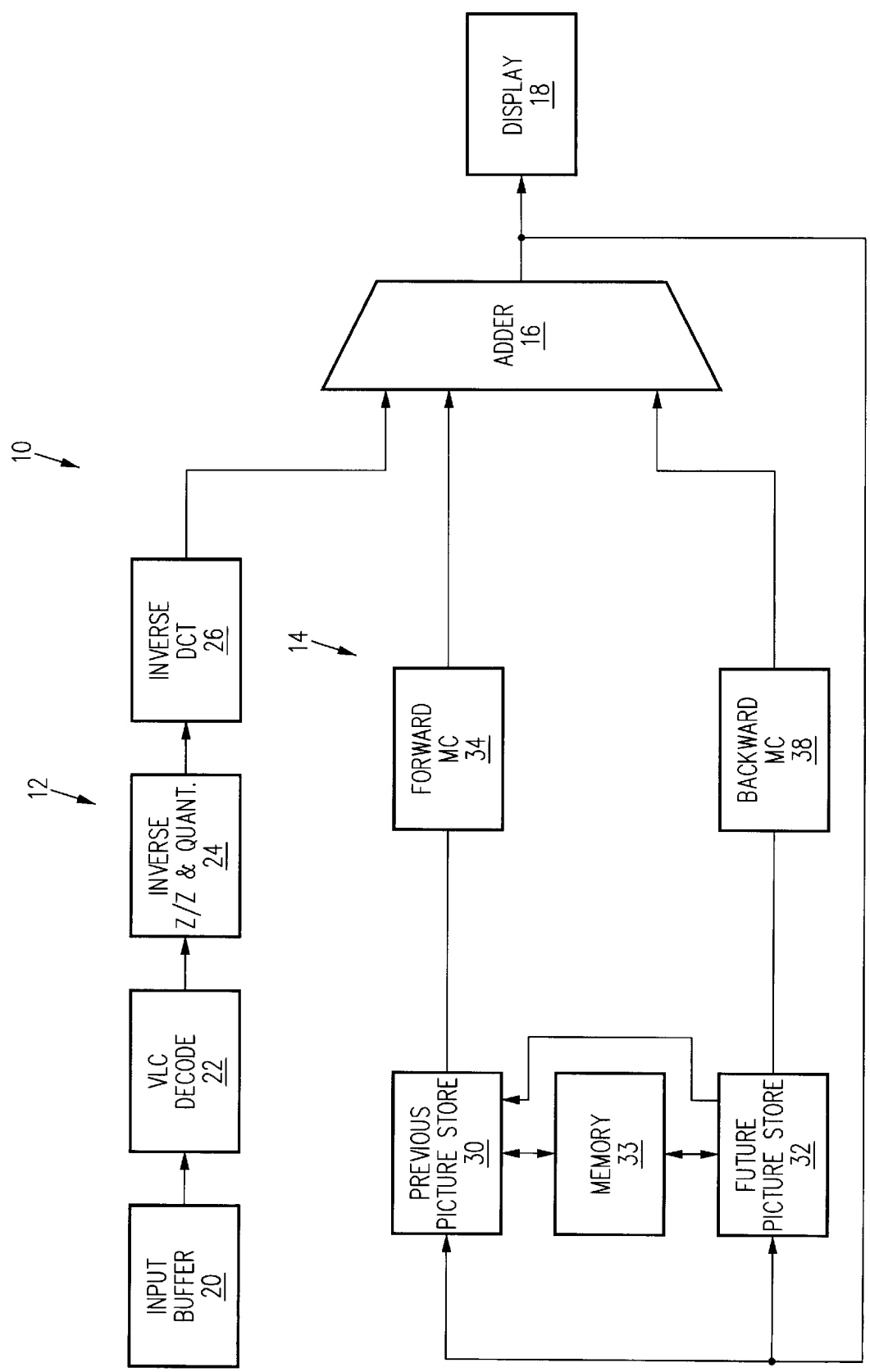
FIG. 2 shows a block diagram of a decoder video system in accordance with the present invention.

Referring to FIG. 2, a system for decompressing video information is shown. Video system 10 includes input stream decoding portion 12 incorporating an inverse discrete cosine transformation, motion decoding portion 14, adder 16 and display device 18. Input stream decoding portion 12 receives a stream of compressed video information and provides blocks of statically decompressed video information to adder 16. Motion decoding portion 14 receives motion information and provides motion compensation information to adder 16. Adder 16 receives the statically decompressed video information and the motion compensation information and provides decompressed video information to display 18.

Input stream decoding portion 12 includes input buffer 20, variable length coding (VLC) decoder 22, inverse zig-zag and quantizer circuit 24 and inverse digital cosine transform circuit 26. Motion decoding portion 14 includes previous picture store circuit 30, future picture store circuit 32, memory 33, forward motion compensation circuit 34 and backward motion compensation circuit 38. Display device 18 includes a picture buffer (not shown) which allows information provided by adder 16 to be rasterized prior to display by display device 18.

Input stream decoding portion 12 provides statically decompressed video signals to adder 16 on a block-by-block basis. Additionally, forward motion compensation circuit 34 and backward motion compensation circuit 38 of motion decoding portion 14 provide motion compensation signals to adder 16 on a macroblock by macroblock basis. Adder 16 provides a decompressed video signal to display 18 on a picture by picture basis. The decompressed video signal is also provided as a previous picture signal to previous picture store circuit 30 and future picture store circuit 32 (in the case of an I or P picture).

Figure 3:
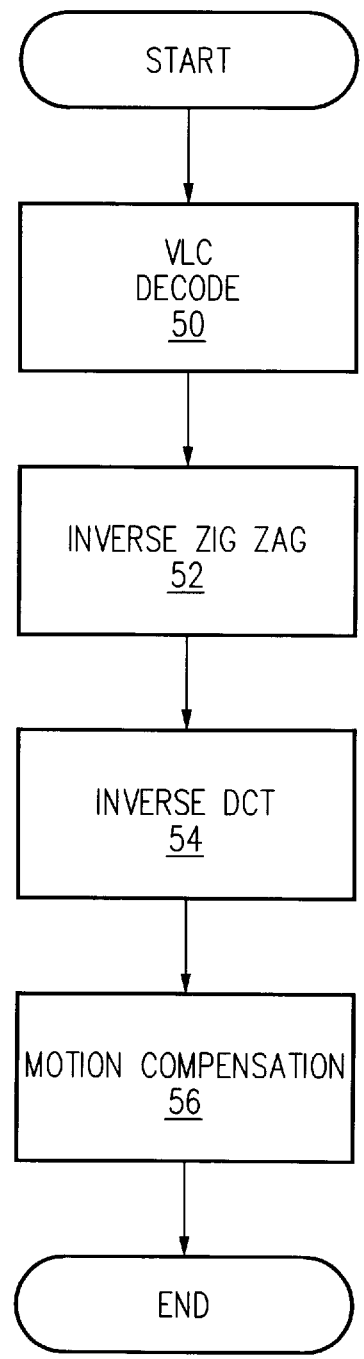
FIG. 3 shows a flow chart describing a process of decoding of video information which is encoded using the MPEG standard.

Referring to FIGS. 2 and 3, in operation, input buffer 20 receives a compressed video signal in the form of a bitstream from a video signal source such as a CD ROM (not shown); the compressed video signal is provided as a stream of compressed video information. Input buffer 20 buffers this compressed video signal to compensate for the speed which the signal is provided by the video source. The input bitstream is accumulated in the input buffer 20 until the bitstream data is to be utilized. This buffered compressed video signal is provided to VLC decoder 22 which decodes the variable length coded portion of the compressed signal at VLC decoding step 50 to provided a variable length decoded signal.

The variable length decoded signal is provided to inverse zig-zag and quantizer circuit 24 which, at inverse zig-zag and quantization step 52, decodes the variable length coded signal to provide a zig-zag decoded signal. Inverse zig-zag and quantizer circuit 24 produces actual DCT coefficients using a preset quantization step size. When a signal is encoded, data is run-length encoded in zig-zag ordering across an image so that compression is optimized. In general, most of the energy in an image is concentrated at the low frequency coefficients, which are conventionally written in the upper left corner of the transformed matrix, Therefore, image data which has been converted to a frequency representation typically has larger coefficients at lower spatial frequencies, clustered at the upper left corner of a frequency image block. Coefficients typically decrease along rays extending from the zero-frequency, or DC, term to higher spatial frequency terms. A block of data is compressed by discrete cosine transform (DCT) coefficient quantization. Most of the information in a block is contained in the lower frequency coefficients. Quantization serves to remove small coefficients—coefficients that are smaller than a quantization step. Higher frequency coefficients have a larger quantization step. Zig-zag ordering is used to reorder the quantized discrete cosine transform (DCT) block of coefficients so that non-zero coefficients are transmitted first, thereby increasing transmission efficiency. The inverse zig-zag and quantization step 52 compensates for the fact that, while a compressed video signal is compressed in a zig-zag run length code fashion, the zig-zag decoded signal is provided to inverse DCT circuit 26 as sequential blocks of video information. Accordingly, this zig-zag decoded signal provides blocks which are in a suitable order for raster scanning across display 18.

When a signal is encoded, an image block is first transformed from the spatial domain to the frequency domain using the Discrete Cosine Transform (DCT), which separates the signal into independent frequency bands. Most of the frequency information is in the upper left corner of the resulting block. The zig-zag decoded signal is applied to inverse DCT circuit 26 to convert the frequency domain image into the spatial domain. The inverse DCT circuit 26, at inverse DCT step 54, performs an inverse digital cosine transform on the zig-zag decoded video signal on a block-by-block basis to provide a decompressed video signal. This decompressed video signal corresponds to either error terms for P or B-coded macroblocks or pixels for I-coded macroblocks.

The decompressed signal is provided to adder 16 which, if the signal does not include any motion information (i.e., I pictures) provides this signal to display 18. However, for video signals which include motion information (i.e., B pictures and P pictures), adder 16 uses the forward motion compensation and backward motion compensation outputs from motion decode portion 19 to generate the video information which is provided to display 18 at motion compensation step 56. More specifically, forward motion vectors are used to locate information in previous picture store circuit 30 and backward motion vectors are used to locate information in future picture store circuit 32 and this information is added to the output provided by inverse DCT circuit 26.

VLC decoder 22 decodes a sequence of pictures in the following manner. VLC decoder 22 first decodes the header of a first picture, called picture 0, and determines that it is an I-picture. VLC decoder 22 produces quantized coefficients corresponding to the quantized DCT coefficients. These are assembled for each 8 by 8 block of pixels in the image by inverse zig-zag scanning. VLC decoder 22 decodes the header of the next picture, picture 3, and determines that it is a P-picture. For each inter-coded macroblock, the VLC decoder 22 decodes motion vectors giving the displacement from the stored previous picture, and quantized coefficients corresponding to the quantized DCT coefficients. The quantized DCT coefficients are error terms in the form of a difference block. For an intra-coded macroblock, all six blocks include IDCT values. For inter-coded or predicted macroblocks, not all six blocks include IDCT error terms. These quantized coefficients are inverse quantized to produce actual DCT coefficients. The coefficients are transformed into pixel difference values and added to the predicted block which are generated by applying the motion vectors to macroblocks in the stored previous picture. The resultant macroblock is displayed on display 18. This picture is not displayed until B-pictures 1 and 2 have been received, decoded, and displayed. VLC decoder 22 decodes the header of the next picture, picture 1, and determines that it is a B-picture. For each interceded macroblock, the VLC decoder decodes motion vectors giving the displacement from the stored previous or future pictures or both, and quantized coefficients corresponding to the quantized DCT coefficients of the difference block. These quantized coefficients are inverse quantized to produce actual DCT coefficients. The coefficients are inverse transformed into difference pixel values and added to a predicted macroblock produced by applying the motion vectors to the stored pictures. The resultant macroblock is stored in display 18. The macroblock is displayed at a suitable time.

Figures 4, 5:
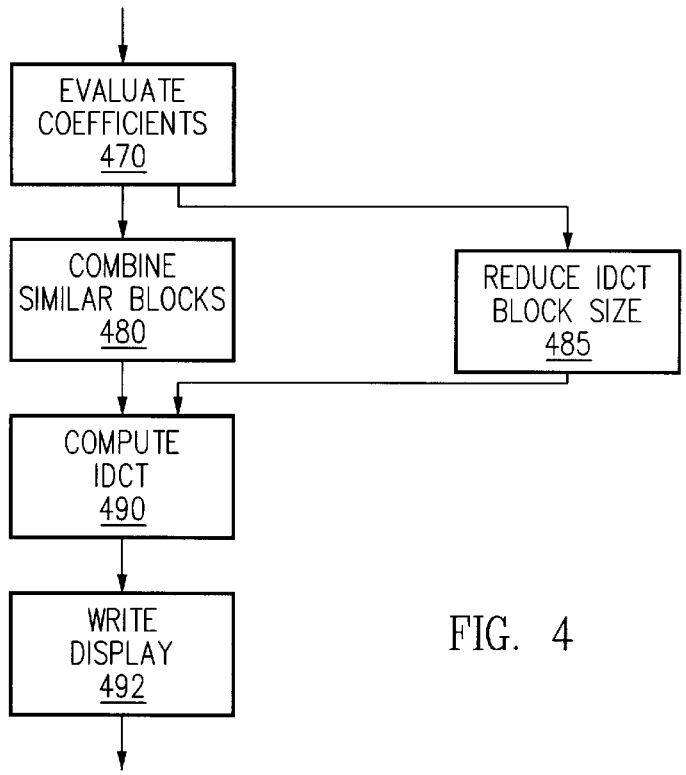
FIG. 4 shows a flow chart describing a process of decoding of video information using selective reduction of spatial resolution.
FIG. 5 illustrates the form of a DCT coefficient block.

Referring to FIG. 4, an IDCT procedure 450 reduces the computational load of the video decoding operation by selecting an exemplary block of a plurality of DCT coefficient blocks, computing the inverse discrete cosine transform (IDCT) of the exemplary block and writing the block resulting from the IDCT operation to pixel regions in a spatial picture corresponding to the plurality of DCT coefficient blocks. The IDCT procedure 450 includes an evaluate coefficients step 470, a combine similar blocks step 480, a compute IDCT procedure 490, and a write display procedure 492.

Evaluate coefficients step 470 examines the coefficients in multiple blocks of DCT coefficients to detect various relationships between the coefficients in the multiple blocks. Evaluate coefficients step 470 examines the transform domain content of various spatially related blocks in a compressed video bitstream to determine whether a predetermined type of similarity exists between multiple blocks. For example, in some embodiments evaluate coefficients step 470 determines the number and position of zero-valued coefficients and the number and position of nonzero-valued coefficients and the relative proportion of coefficients having a value of zero, compared to the number of coefficients having a nonzero value. Generally, multiple DCT coefficient blocks are similar if substantially the same coefficient positions of the 8×8 matrix have nonzero coefficient values and the values of the nonzero coefficients are similar.

Evaluate coefficients step 470 examines blocks in a selected configuration. In one embodiment, evaluate coefficients step 470 examines the four 8×8 DCT blocks which make up a 16×16 luminance macroblock. In other embodiments a selected number of 8×8 DCT blocks in different macroblocks are examined. Furthermore, the technique is not limited to application with luminance blocks but is also applicable to chrominance blocks.

When evaluate coefficients step 470 finds certain selected similarities, a combine similar blocks step 480 combines the blocks in a selected predetermined manner. In some embodiments, combine similar blocks step 480 averages DCT coefficients of a plurality of blocks to form one averaged block. Referring to FIG. 5, averaging is achieved by averaging the DCT coefficient in position [0, 0] of a plurality of similar DCT coefficient blocks. Then other positions [0, 1], [0, 2], [0,3], . . [1, 0], [1, 1] to position [7, 7] are separately averaged. In other embodiments, combine similar blocks step 480 selects a representative block of a plurality of similar DCT coefficient blocks.

In some embodiments, evaluate coefficients step 470 examines 8×8 DCT blocks to evaluate whether an IDCT operation of a smaller size is feasible. For example, if higher frequency coefficients are essentially all zero-value or low-value coefficients, higher frequency coefficients are ignored and the lower frequency coefficients of an 8×8 block are used to form a 4×4 block and the 4×4 block is inverse discrete cosine transformed in reduce IDCT block size step 485. The inverse DCT is performed on smaller blocks and the result is scaled back to the proper block size. For example, typical 8×8 MPEG standard blocks are reduced to 4×4 blocks to save approximately three quarters of the processing steps.

Compute IDCT procedure 490 computes an inverse discrete cosine transform on the 8×8 DCT coefficient block determined in combine similar blocks step 480, for example either an averaged block or a representative block of a mutually similar plurality of blocks.

An 8×8 forward discrete cosine transform (DCT) is defined by the following equation:

$$X(u, v) = (1/4)C(u)C(v) \sum_{i=0}^{7} \sum_{j=0}^{7} x(i, j)\cos\left(\frac{\pi(2i+1)u}{16}\right)\cos\left(\frac{\pi(2j+1)v}{16}\right);$$

where x(i,j) is a pixel value in an 8×8 image block in spatial domains i and j, and X(u,v) is a transformed coefficient in an 8×8 transform block in transform domains u,v. C(0) is $1/\sqrt{2}$ and C(u)=C(v)=1.

An inverse discrete cosine transform (IDCT) is defined by the following equation:

$$X(i, j) = (1/4) \sum_{i=0}^{7} \sum_{j=0}^{7} C(u)C(v)X(u, v)\cos\left(\frac{\pi(2i+1)u}{16}\right)\cos\left(\frac{\pi(2j+1)v}{16}\right).$$

An 8×8 IDCT is considered to be a combination of a set of 64 orthogonal DCT basis matrices, one basis matrix for each two-dimensional frequency (v, u). Furthermore, each basis matrix is considered to be the two-dimensional IDCT transform of each single transform coefficient set to one. Since there are 64 transform coefficients in an 8×8 IDCT, there are 64 basis matrices. The IDCT kernel K(v, u), also called a DCT basis matrix, represents a transform coefficient at frequency (v, u) according to the equation:

$$K(v, u) = v(u)v(v) \cos((2m+1)\pi u/16) \cos((2n+1)\pi v/16),$$

where v(u) and v(v) are normalization coefficients defined as $v(u)=1/\sqrt{8}$ for u=0 and $v(u)=\frac{1}{2}$ for u>0. The IDCT is computed by scaling each kernel by the transform coefficient at that location and summing the scaled kernels. The spatial domain matrix S is obtained using the equation, as follows:

$$S = \sum_{v} \sum_{u} F_{vu} K(v, u).$$

Following compute IDCT step 490, the transformed block, for example an averaged block or a representative block of a plurality of similar blocks, is written to display 10 by write display procedure 492 at the position of each of the averaged blocks.

In an area of a picture having little spatial detail, for example an area of constant color, each of the DCT coefficient blocks typically has only a small number of nonzero DCT coefficients. Furthermore, the nonzero DCT coefficients are generally low-frequency coefficients. For an image with little spatial detail, multiple blocks are combined, either by averaging or selection of a representative block with a great reduction in computational load and only a slight general degradation in image quality.

The description of certain embodiments of this invention is intended to be illustrative and not limiting. Numerous other embodiments will be apparent to those skilled in the art, all of which are included within the broad scope of this invention. For example, the embodiments described herein are computer-based implementations. Electronic circuit based embodiments which perform the same function are expressly included within the scope of the claims. Furthermore, although an embodiment which averages or selects pixels in an 8×8 block for reconstruction of a 16×16 pixel macroblock is described most particularly, embodiments operating on different data sizes are also within the scope of the invention. For example, the technique is also applied between blocks in different macroblocks.

What is claimed is:

1. A method of decoding video pictures comprising the steps of:
   accessing a plurality of blocks of DCT coefficients;
   examining the DCT coefficients of a first block in comparison to corresponding DCT coefficients of a spatially different second block the first and second blocks being of the same temporal frame, wherein the examining step includes the steps of;
      determining a number and relative position of zero-valued coefficients in the first block and the second block; and
      determining a number and relative position of nonzero-valued coefficients in the first block and the second block;
   detecting a predetermined type of similarity between examined blocks in response to the examining step wherein the detecting step includes the step of:
      detecting a similar condition in the first block and the second block when the position and number of zero-valued coefficients is substantially similar and the position and number of nonzero-valued coefficients is substantially similar,
   spatially combining corresponding DCT coefficients of a plurality of blocks for which the predetermined type of similarity is detected: and
   inverse discrete cosine transforming the spatially combined blocks.

2. A method of decoding video pictures comprising the steps of:
   accessing a plurality of blocks of DCT coefficients;
   examining the DCT coefficients of a first block in comparison to corresponding DCT coefficients of a spatially different second block, the first and second blocks being of the same temporal frame, wherein the examining step includes the steps of:
      determining a number and relative position of zero-valued coefficients in the first block and the second block, and
      determining a number and relative position of nonzero-valued coefficients in the first block and the second block,
   detecting a predetermined type of similarity between examined blocks in response to the examining step, wherein the detecting step includes the step of:
      detecting a similar condition in the first block and the second block when the proportion of zero-valued coefficients to nonzero-valued coefficients is substantially similar in the first block and the second block,
   spatially combining corresponding DCT coefficients of a plurality of blocks for which the predetermined type of similarity is detected; and
   inverse discrete cosine transforming the spatially combined blocks.

3. A method according to claim 2 wherein the spatially combining step includes the step of:
   averaging corresponding DCT coefficients of a plurality of similar blocks.

4. A method according to claim 2 wherein the spatially combining step includes the step of:
   replacing corresponding DCT coefficients of a plurality of similar blocks with a common set of similar blocks.

5. A method according to claim 1 wherein the spatially combining step includes the step of:
   averaging corresponding DCT coefficients of a plurality of similar blocks.

6. A method according to claim 1 wherein the spatially combining step includes the step of:
   replacing corresponding DCT coefficients of a plurality of similar blocks with a common set of similar blocks.

7. A computer program product comprising:
   a computer usable medium having computable readable code embodied therein performing the method according to claim 1.

8. A computer program product comprising:
   a computer usable medium having computable readable code embodied therein performing the method according to claim 1.

9. A method of decoding video pictures comprising the steps of:
   accessing a plurality of blocks of DCT coefficients;
   examining the DCT coefficients of one block in comparison to corresponding DCT coefficients of another block the examining step including the steps of:
      determining a relative number and a relative position of zero-valued coefficients in the blocks; and
      determining a relative number and a relative position of nonzero-valued coefficients in the blocks;
   detecting a predetermined type of similarity between examined blocks in response to the examining step the detecting step including the steps of
      detecting a relative similar condition in the blocks based on the position and number of zero-valued coefficients and the position and number of nonzero-valued coefficients, and
      detecting a relative similar condition in the blocks when the position and number of zero-valued coefficients is substantially similar and the position and number of nonzero-valued coefficients is substantially similar;
   spatially combining corresponding DCT coefficients of a plurality of blocks for which the predetermined type of similarity is detected, and
   inverse discrete cosine transforming the spatially combined blocks.

10. A method of decoding video pictures comprising the steps of:
    accessing a plurality of blocks of DCT coefficients;
    examining the DCT coefficients of one block in comparison to corresponding DCT coefficients of another block, the examining step including the steps of:
       determining a relative number and a relative position of zero-valued coefficients in the blocks; and
       determining a relative number and a relative position of nonzero-valued coefficients in the blocks;
    detecting a predetermined type of similarity between examined blocks in response to the examining step, the detecting step including the step of:
       detecting a relative similar condition in the blocks based on the position and number of zero-valued coefficients and the position and number of nonzero-valued coefficients; and
    detecting a relative similar condition in the blocks when the proportion of zero-valued coefficients to nonzero-valued coefficients is substantially similar in the first block and the second blocks;
    spatially combining corresponding DCT coefficients of a plurality of blocks for which the predetermined type of similarity is detected; and
    inverse discrete cosine transforming the spatially combined blocks.

* * * * *